US012810645B2

(12) United States Patent
Oshikawa et al.

(10) Patent No.: US 12,810,645 B2
(45) Date of Patent: Nov. 24, 2026

(54) SCANNING SYSTEM AND INFORMATION PROCESSING PROGRAM

(71) Applicant: SEIKO EPSON CORPORATION, Tokyo (JP)

(72) Inventors: Naoki Oshikawa, Kofu (JP); Toshifumi Sakai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 234 days.

(21) Appl. No.: 18/441,034

(22) Filed: Feb. 14, 2024

(65) Prior Publication Data

US 2024/0282138 A1 Aug. 22, 2024

(30) Foreign Application Priority Data

Feb. 16, 2023 (JP) ................................ 2023-022623

(51) Int. Cl.
*G06V 30/418* (2022.01)
*G06V 30/10* (2022.01)
*G06V 30/416* (2022.01)

(52) U.S. Cl.
CPC ............ *G06V 30/418* (2022.01); *G06V 30/10* (2022.01); *G06V 30/416* (2022.01)

(58) Field of Classification Search
CPC .... G06V 30/418; G06V 30/10; G06V 30/416; G06V 30/413; H04N 1/00005; H04N 1/00037; H04N 1/00082; H04N 1/00092; H04N 1/04
See application file for complete search history.

(56) References Cited

U.S. PATENT DOCUMENTS 5,491,760 A * 2/1996 Withgott .............. G06V 30/262 382/229
2006/0282760 A1* 12/2006 Tanaka ................. G06V 30/416 707/999.1
2010/0082937 A1 4/2010 Sasaki
(Continued)

FOREIGN PATENT DOCUMENTS

JP 2010-086151 A 4/2010
JP 2012-160000 A 8/2012
(Continued)

OTHER PUBLICATIONS

"Lin, X, Detection and Analysis of Table of Contents Based on Content Association, May 25, 2005, HP, pp. 1-21" (Year: 2005).*
(Continued)

*Primary Examiner* — Andrew W Bee
*Assistant Examiner* — Devin J Dhooge
(74) *Attorney, Agent, or Firm* — Spencer Fane LLP

(57) ABSTRACT

A scanning system includes: a document reading unit configured to read a document and generate first image data of a plurality of pages read from the document; a recognition unit configured to recognize a character included in image data of the plurality of pages; a difference elimination unit configured to detect, based on a recognition result obtained by the recognition unit, a difference between first page information obtained from the recognition result and second page information sequentially assigned to image data; and an output unit configured to output second image data including table-of-contents information in which the difference is eliminated.

11 Claims, 10 Drawing Sheets

(56) References Cited

U.S. PATENT DOCUMENTS

| | | | | |
|---|---|---|---|---|
| 2012/0197908 | A1 | 8/2012 | Unno | |
| 2014/0099038 | A1 | 4/2014 | Okada et al. | |
| 2020/0396340 | A1* | 12/2020 | Ybanez | G06V 30/416 |
| 2022/0318224 | A1* | 10/2022 | Thompson | G06V 30/414 |
| 2022/0319219 | A1* | 10/2022 | Tsibulevskiy | G06F 18/40 |

FOREIGN PATENT DOCUMENTS

| | | | |
|---|---|---|---|
| JP | 2014-075029 | A | 4/2014 |
| JP | 2021-197616 | A | 12/2021 |

OTHER PUBLICATIONS

"Wu, Z, Table of Contents Recognition and Extraction for Heterogeneous Book Documents, 2013, IST, 12th International Conference on Document Analysis and Recognition, pp. 1205-1209" (Year: 2013).*

* cited by examiner

SCANNING SYSTEM AND INFORMATION PROCESSING PROGRAM

The present application is based on, and claims priority from JP Application Serial Number 2023-022623, filed Feb. 16, 2023, the disclosure of which is hereby incorporated by reference herein in its entirety.

BACKGROUND

1. Technical Field

The present disclosure relates to a scanning system and an information processing program.

2. Related Art

There is known a scanning system that reads a document of a plurality of pages to generate image data of the plurality of pages, performs optical character reading (OCR) processing to recognize characters in the document, extracts a table of contents, and generates an electronic document to which bookmark information is added (for example, see JP-A-2021-197616). A user who views the generated electronic document can search for a desired location from a main text by referring to the table of contents in the bookmark information.

JP-A-2021-197616 is an example of the related art.

The document of the plurality of pages may include a cover, a preface, and the like to which page numbers of the main text are not attached. In this case, a difference occurs between page numbers sequentially assigned to image data by the scanning system and page numbers assigned to the main text of the document. Such a difference in the page numbers is inconvenient when searching for a desired location from the main text.

SUMMARY

A scanning system according to the present disclosure includes:

- a document reading unit configured to read a document and generate first image data of a plurality of pages read from the document;
- a recognition unit configured to recognize a character included in the first image data;
- a difference elimination unit configured to detect, based on a recognition result obtained by the recognition unit, a difference between first page information obtained from the recognition result and second page information sequentially assigned to image data of the pages, and to generate table-of-contents information including page information in which the difference is eliminated; and
- an output unit configured to output second image data including the table-of-contents information.

In addition, in a non-transitory computer-readable storage medium storing an information processing program according to the present disclosure, the program causes a computer to execute: a recognition function of recognizing a character included in first image data of a plurality of pages read from a document; a difference elimination function of detecting, based on a recognition result obtained by the recognition function, a difference between first page information obtained from the recognition result and second page information sequentially assigned to image data of the pages, and generating table-of-contents information including page information in which the difference is eliminated; and

- an output function of outputting second image data including the table-of-contents information.

In addition, a method for generating second image data according to the present disclosure includes:

- recognizing a character included in first image data of a plurality of pages read from a document;
- detecting a difference between first page information obtained from a recognition result and second page information sequentially assigned to image data of the pages; and
- generating second image data in which the detected difference is eliminated.

DESCRIPTION OF EMBODIMENTS

Figure 1:
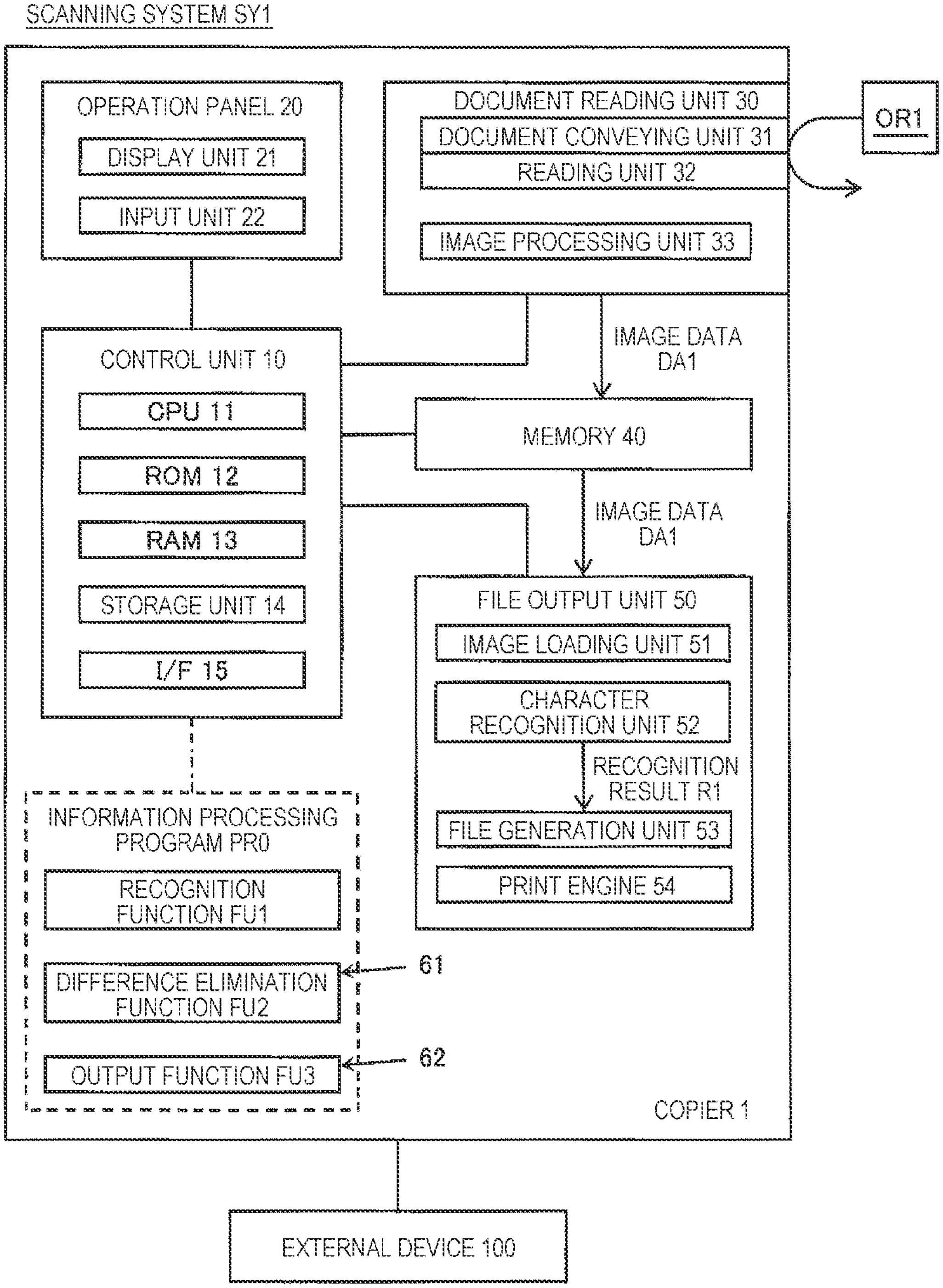
FIG. 1 is a block diagram schematically showing a configuration example of a scanning system.

Hereinafter, an embodiment of the present disclosure will be described. Of course, the following embodiment merely shows the present disclosure, and all of the features described in the embodiment are not necessarily essential to the solutions disclosed herein.

1. Overview of Technique Included in Present Disclosure

First, an overview of a technique included in the present disclosure will be described with reference to examples shown in FIGS. 1 to 10. Drawings of the present application are diagrams schematically showing examples, and a magnification in each direction shown in the drawings may be different, and the drawings may not be consistent. Of course, each element of the present technique is not limited to the specific examples indicated by the reference signs. In "Overview of Technique Included in Present Disclosure", terms in parentheses mean supplementary explanations of immediately preceding terms.

Aspect 1

As shown in FIG. 1 and the like, a scanning system SY1 according to an aspect of the present technique includes a document reading unit 30, a recognition unit (for example, a character recognition unit 52), a difference elimination unit 61, and an output unit 62. As shown in FIGS. 2 to 6, and the like, the document reading unit 30 reads a document OR1 and generates image data DA1 of a plurality of pages read from the document OR1. The image data DA1 is an example of first image data. The recognition unit (52) recognizes characters included in the image data DA1 of the plurality of pages. The difference elimination unit 61 detects, based on a recognition result R1 obtained by the recognition unit 52, a difference (for example, a skip page number Ns shown in FIG. 4) between first page information PA1 obtained from the recognition result R1 and second page information PA2 sequentially assigned to the image data. The difference elimination unit 61 generates table-of-contents information T1 including page information in which the difference (Ns) is eliminated and image data DA2 of a plurality of pages. The image data DA2 is an example of second image data. The page information in which the difference (Ns) is eliminated is, for example, the first page information PAL in the table-of-contents information T1 shown in FIG. 2, and the second page information PA2 in the table-of-contents information T1 shown in FIG. 6. When a page number written in an image matches a page number electronically managed in the image data, it can be said that the difference is eliminated. The output unit 62 outputs the image data DA2 of the plurality of pages having the table-of-contents information T1.

The image data DA2 of the plurality of pages output from the output unit 62 includes the table-of-contents information T1. The table-of-contents information T1 includes page information in which the difference (Ns) between the first page information PA1 obtained from the recognition result R1 of the image data DA1 of the plurality of pages read from the document OR1 and the second page information PA2 sequentially assigned to image data is eliminated. Therefore, according to the above aspect, it is possible to provide a scanning system that outputs image data having a table of contents in which a difference occurring in page information is eliminated from image data of a plurality of pages read from a document.

Here, the scanning system may be a single device such as a copier (including a multifunction peripheral) or a plurality of devices such as an image reading device and a host device.

The table-of-contents information may be information (for example, bookmark information) added to main body data using image data of a plurality of pages read from a document as main body data, or information in which page information after correction is embedded in a position of a table of contents in the main body data.

The page information of the table-of-contents information may be the first page information or the second page information.

In the present application, "first", "second", and the like are terms used to identify each component included in a plurality of components having similarities, and do not mean an order.

An output of the image data of the plurality of pages obtained by the output unit may be an output outside of the output unit, and may be an output to an external device coupled to an image forming device, an e-mail destination, an output to a storage unit in the image forming device, a print of the image data, a display of the image data, or the like.

The above-described additional features are also applied to the following aspects.

Aspect 2

As shown in FIGS. 2 to 5, the difference elimination unit 61 may generate the table-of-contents information T1, which is the table-of-contents information T1 in which the first page information PA1 is displayed, including a link L1 on which image data (image data of a second page) corresponding to the second page information PA2 among the image data DA2 of the plurality of pages is displayed.

In the above case, the first page information PA1 is displayed on the table-of-contents information T1 including the link L1 on which the image data of the second page is displayed. Therefore, in the above aspect, it is possible to obtain the image data having a linked table of contents in which the difference occurring in the page information is eliminated.

The first page information may be displayed in the table-of-contents information, and both the first page information and the second page information may be displayed in the table-of-contents information. The additional features are also applied to the following aspects.

Aspect 3

Figure 2:
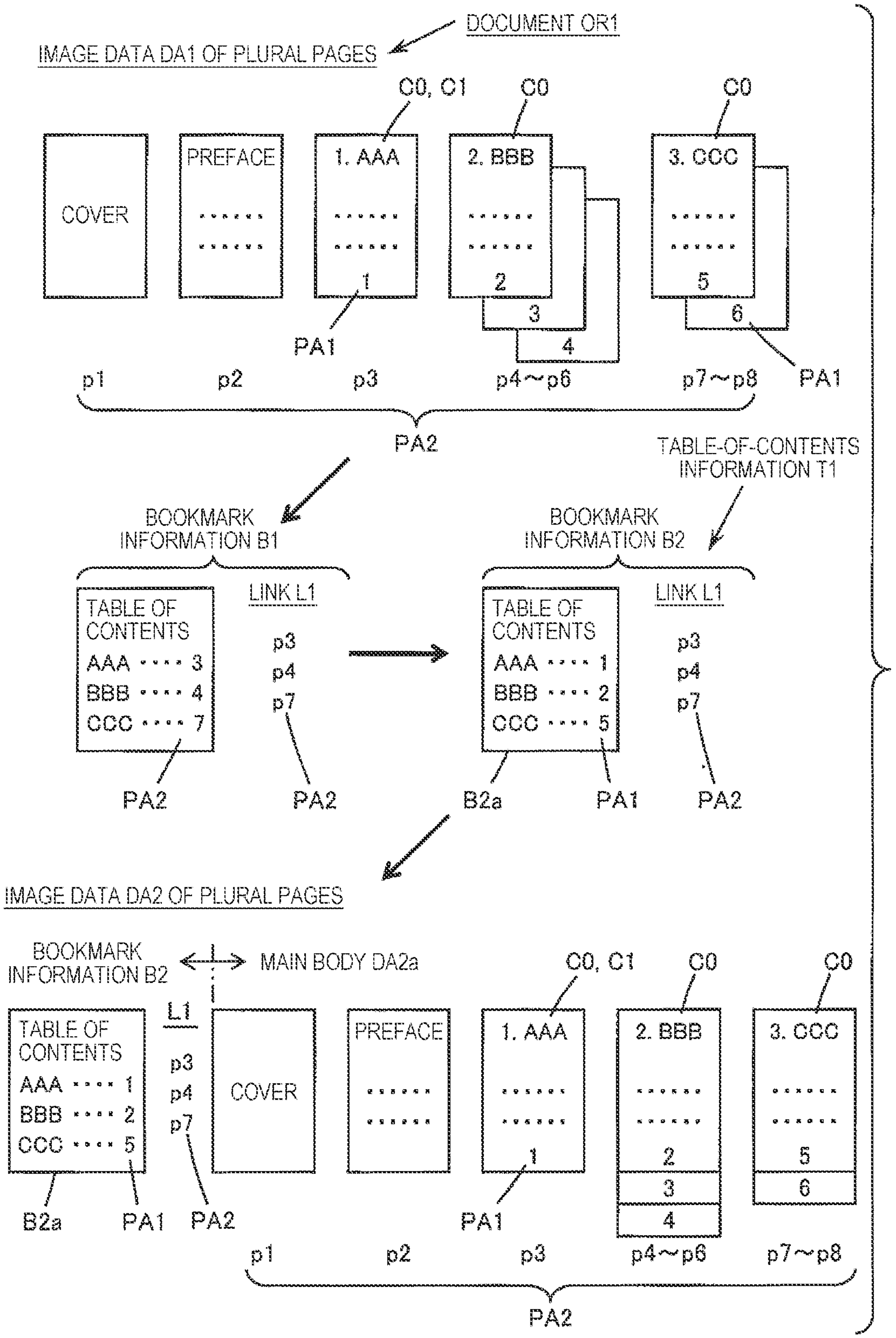
FIG. 2 is a diagram schematically showing an example of adding, to image data of a plurality of pages, table-of-contents information in which a difference in bookmark page information is eliminated.
Figure 4:
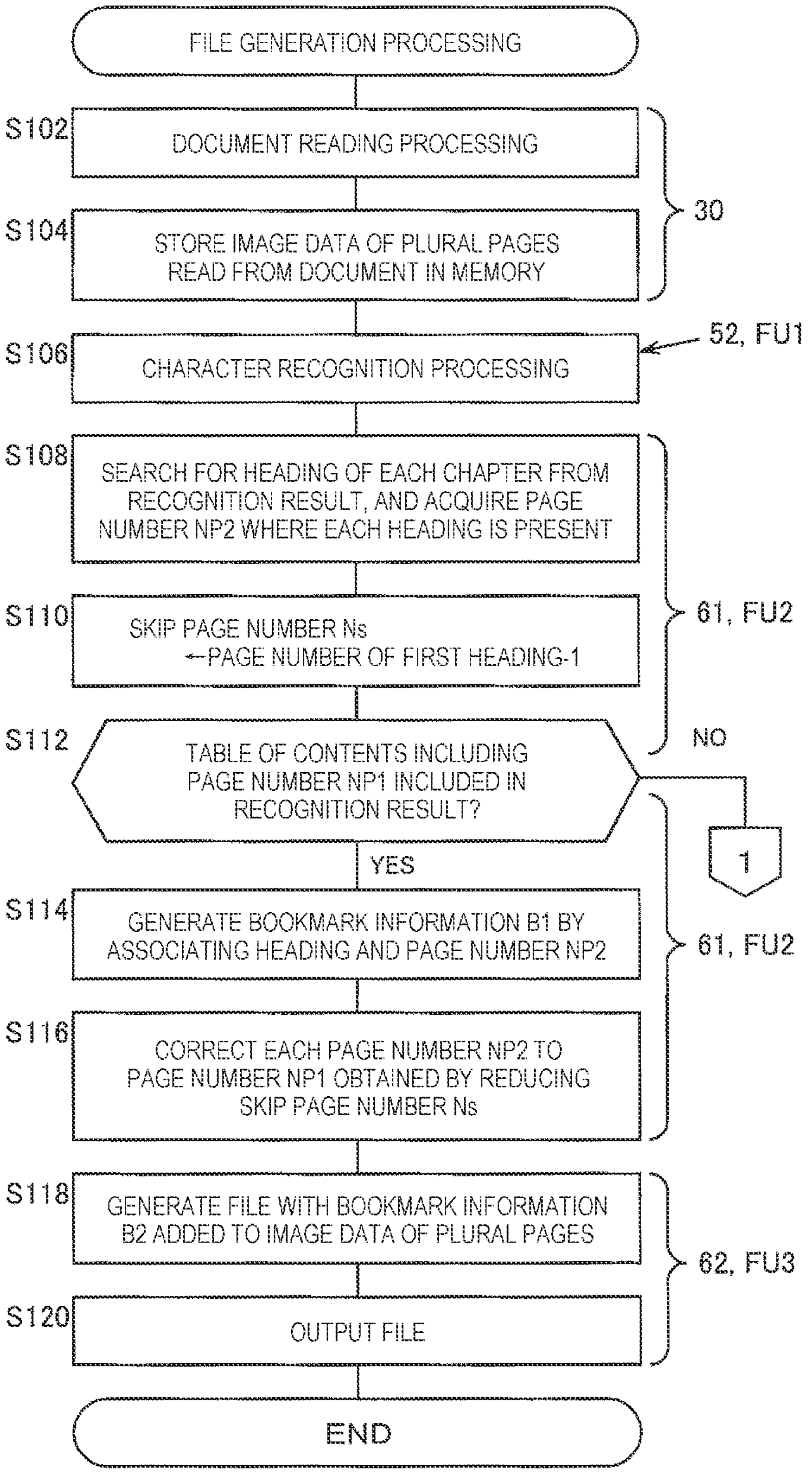
FIG. 4 is a flowchart schematically showing an example of file generation processing.

As shown in FIGS. 2 and 4, the difference elimination unit 61 may search for a heading C1, which is a start of the first page information PA1, from the recognition result R1, and may generate the table-of-contents information T1 in which the first page information PA1 starting from a page in which the heading Cl is present is displayed as a bookmark B2*a*.

In the above case, the first page information PA1 starting from the page in which the heading C1 at a start location searched from the recognition result R1 of characters is present is displayed as the bookmark B2*a*, and the image data of a second page is displayed according to the link L1 of the bookmark B2*a*. Therefore, in the above aspect, it is possible to provide a preferable example of obtaining the image data having a linked table of contents in which the difference occurring in the page information is eliminated.

Aspect 4

Figure 3:
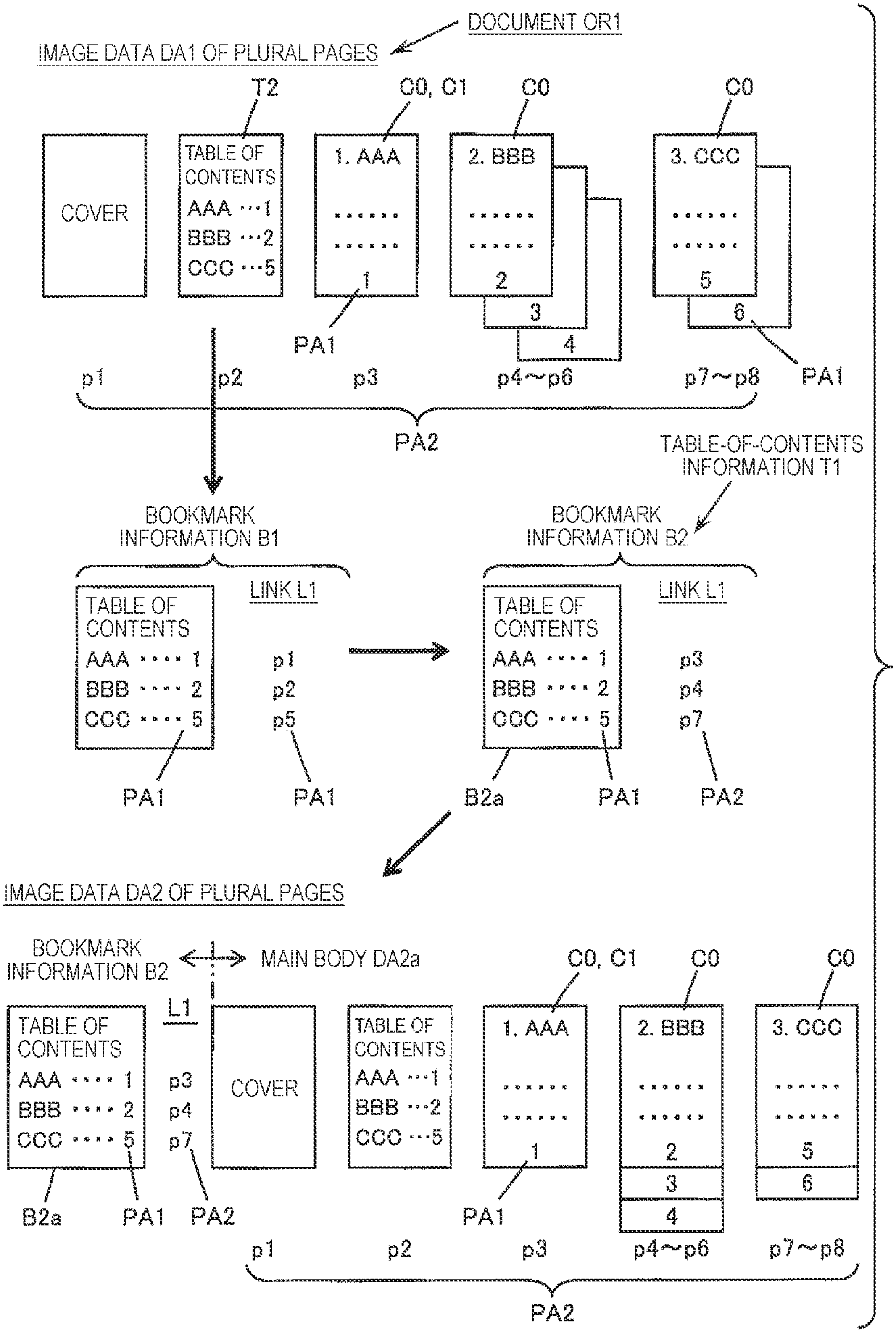
FIG. 3 is a diagram schematically showing an example of adding, to the image data of the plurality of pages, table-of-contents information in which a difference in link page information is eliminated.
Figure 5:
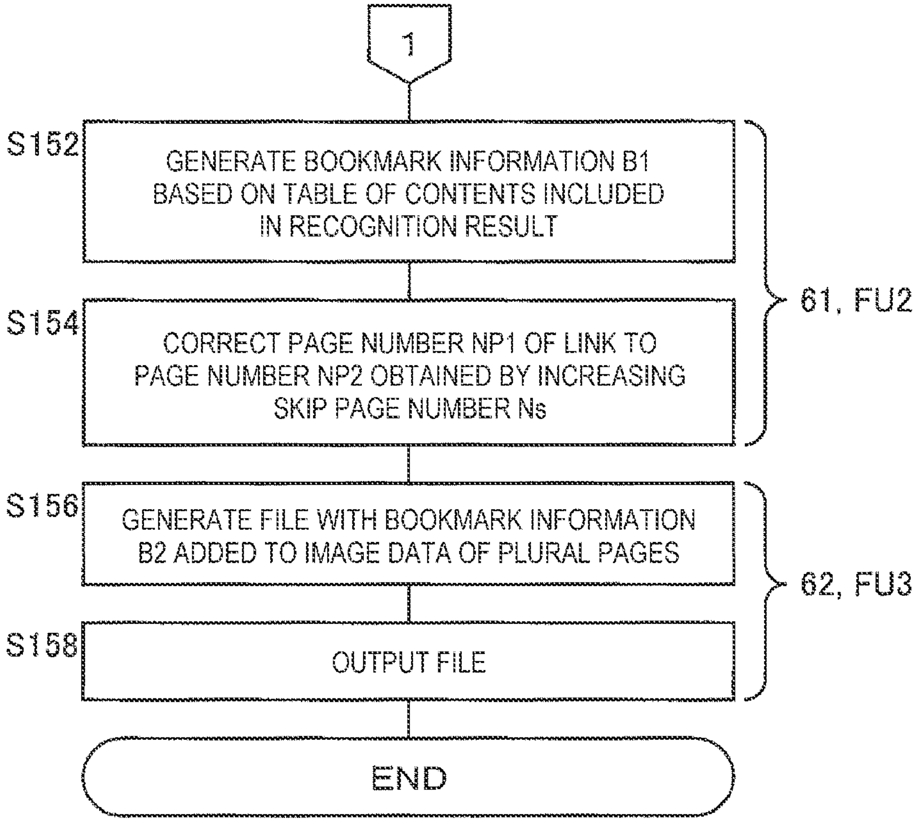
FIG. 5 is a flowchart schematically showing an example of the file generation processing.

As shown in FIGS. 3 and 5, when a table of contents T2 including the first page information PA1 is included in the recognition result R1, the difference elimination unit 61 may generate, from the table of contents T2, the table-of-contents information T1, which is the table-of-contents information T1 in which the first page information PA1 is displayed as the bookmark B2*a*, including the link L1 on which the image data corresponding to the second page information PA2 among the image data DAL of the plurality of pages is displayed.

In the above case, the first page information PA1 included in the table of contents T2 included in the recognition result R1 of the characters is displayed as the bookmark B2*a*, and the image data of the second page is displayed according to the link L1 of the bookmark B2*a*. Therefore, in the above aspect, it is also possible to provide a preferable example of obtaining the image data having a linked table of contents in which the difference occurring in the page information is eliminated.

Aspect 5

Figure 6:
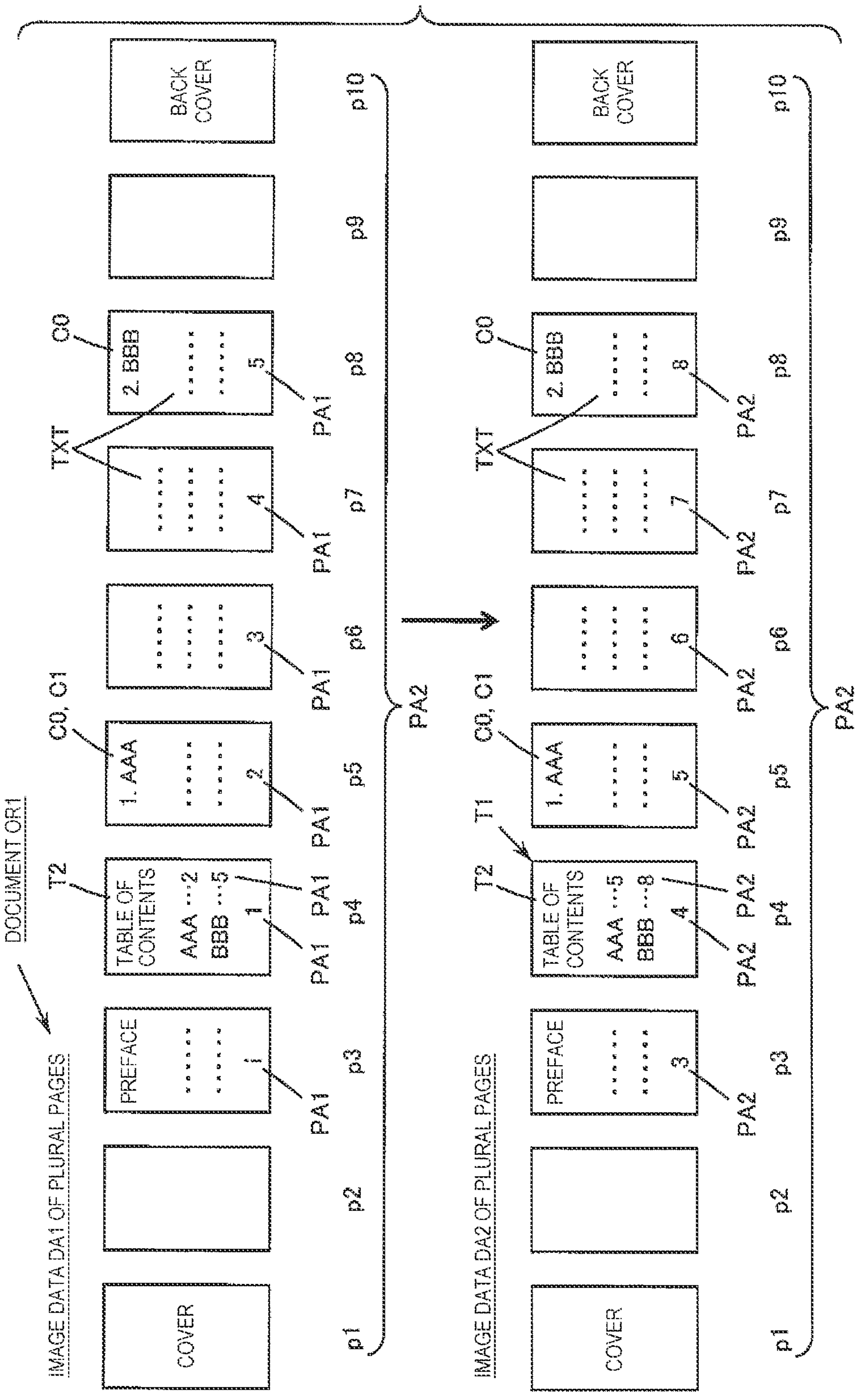
FIG. 6 is a diagram schematically showing an example of eliminating a difference in page information included in the image data.
Figure 7:
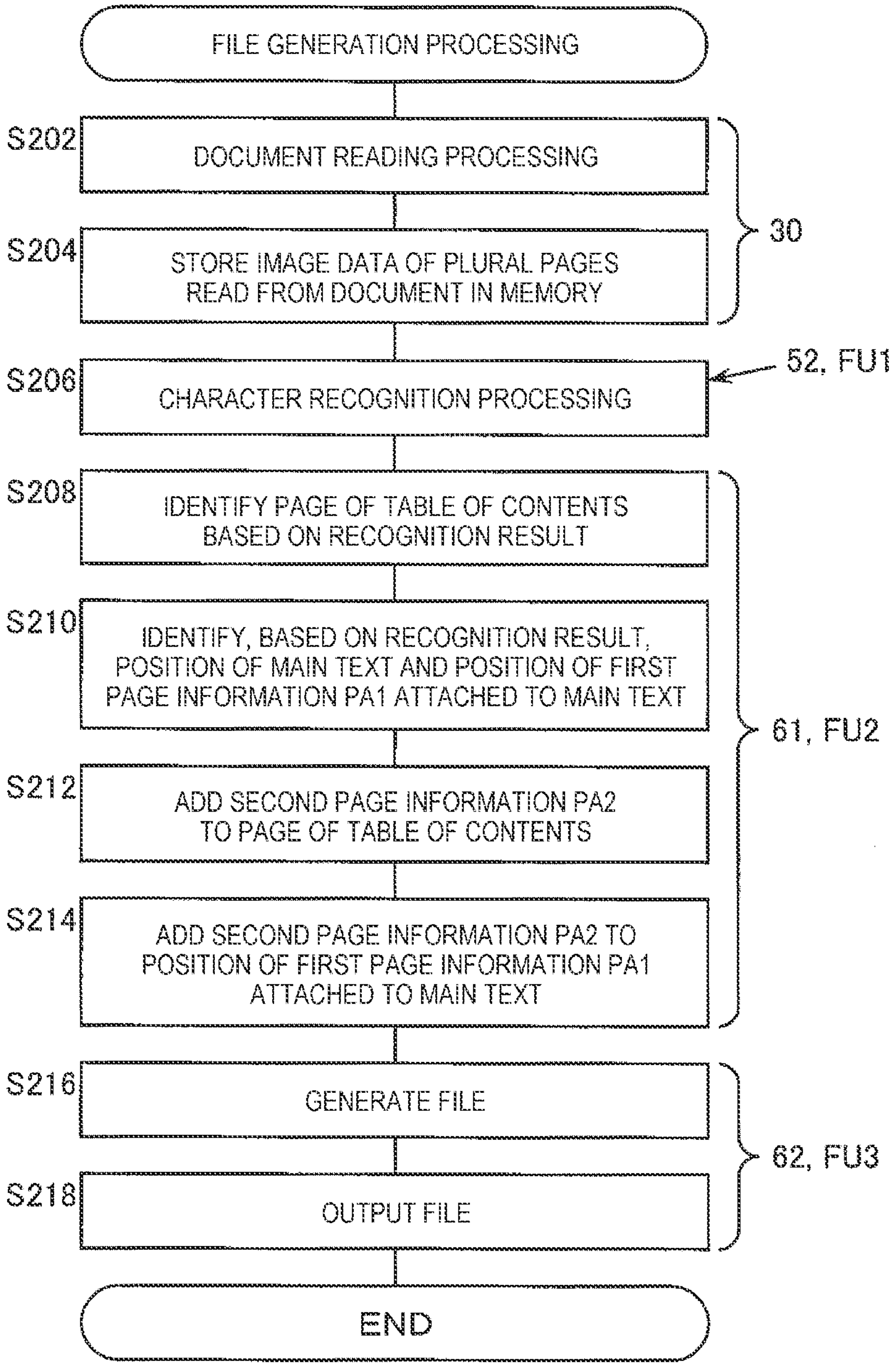
FIG. 7 is a flowchart schematically showing another example of the file generation processing.

As shown in FIGS. 6, 7, and the like, the difference elimination unit 61 may generate the table-of-contents information T1 in which the second page information PA2 is displayed. In the aspect, it is also possible to provide a preferable example of obtaining the image data having a table of contents in which the difference occurring in the page information is eliminated.

The second page information may be displayed in the table-of-contents information, and both the first page information and the second page information may be displayed in the table-of-contents information. The additional features are also applied to the following aspects.

Aspect 6

As shown in FIGS. 6 and 7, the difference elimination unit 61 may identify, based on the recognition result R1, a position of the first page information PA1 included in the image data DA1 of the plurality of pages. The difference elimination unit 61 may add the second page information PA2 to the image data DA1 of the plurality of pages at the position of the first page information PA1.

In the above case, not only the table of contents T2 but also the difference occurring in the page information included in the image data DA1 of the plurality of pages read from the document OR1 is eliminated. Therefore, in the above aspect, it is possible to provide a preferable example of obtaining image data in which the difference occurring in the page information is eliminated.

Aspect 7

Figure 8:
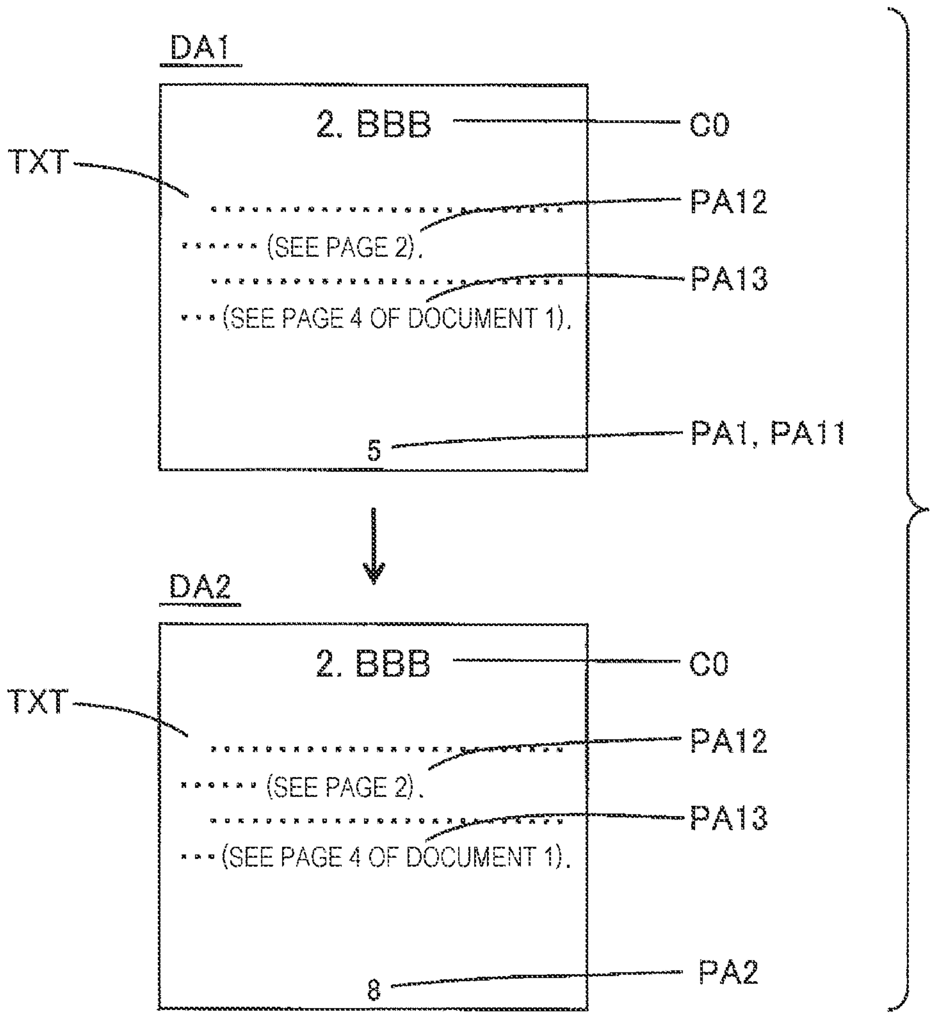
FIG. 8 is a diagram schematically showing an example of correcting page information attached to a main text without correcting page information of the main text.

As shown in FIGS. 6 to 8, the difference elimination unit 61 may identify, based on the recognition result R1, a position of a main text TXT and a position of the first page information PA1 attached to the main text TXT from the image data DA1 of the plurality of pages. The difference elimination unit 61 may not add the second page information PA2 to the position of the main text TXT, but add the second page information PA2 to the image data DA1 of the plurality of pages at the position of the first page information PA1.

In the above case, not only the table of contents T2 but also the difference occurring in the page information attached to the main text TXT is eliminated. Therefore, in the above aspect, it is also possible to provide a preferable example of obtaining image data in which the difference occurring in the page information is eliminated.

Aspect 8

Figure 9:
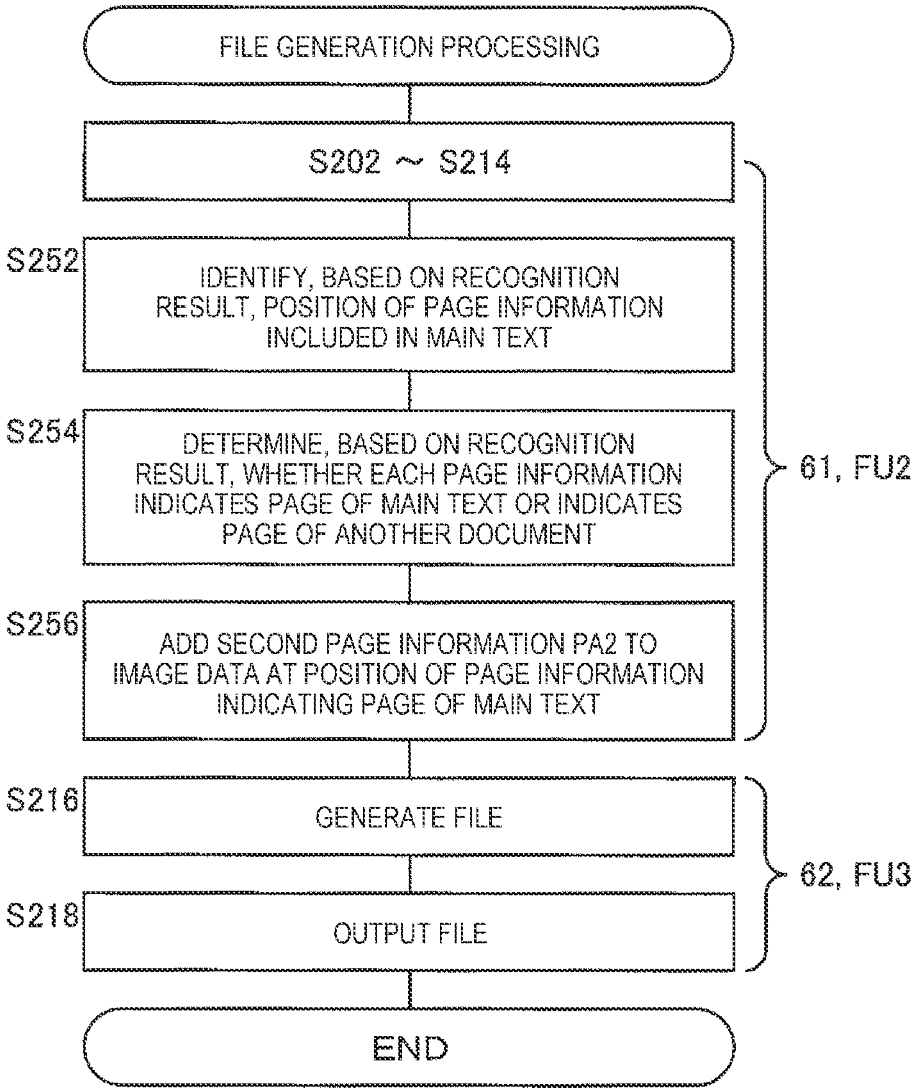
FIG. 9 is a flowchart schematically showing another example of the file generation processing.
Figure 10:
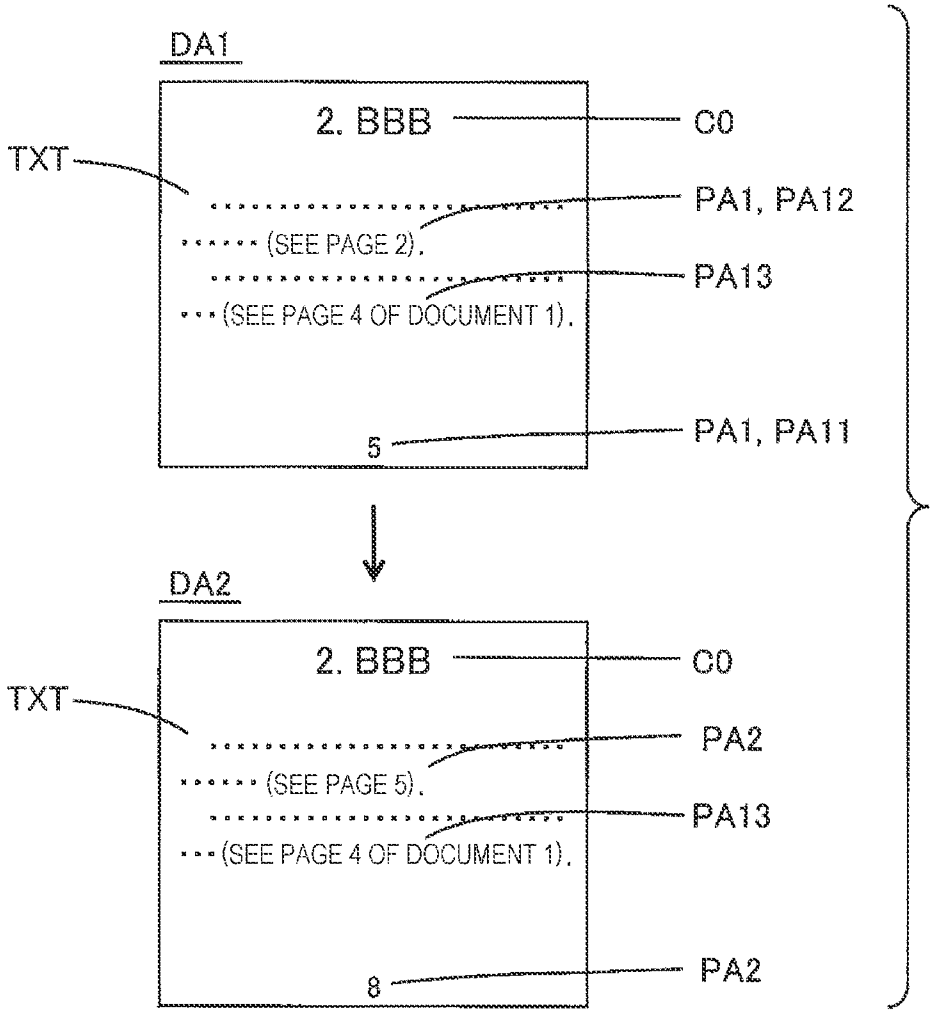
FIG. 10 is a diagram schematically showing an example of correcting page information of image data without correcting page information of another document.

The difference elimination unit 61 may identify, based on the recognition result R1, a position of page information included in the image data DA1 of the plurality of pages. As shown in FIG. 9, the difference elimination unit 61 may determine, based on the recognition result R1, whether the page information included in the image data DA1 of the plurality of pages indicates a page of the image data DA1 of the plurality of pages or indicates a page of another document. As shown in FIGS. 9 and 10, the difference elimination unit 61 may not add the second page information PA2 to a position where the page information included in the image data DA1 of the plurality of pages indicates the of another page document, but add the second page information PA2 to the image data DAL of the plurality of pages at a position where the page information included in the image data DA1 of the plurality of pages indicates the page of the image data DA1 of the plurality of pages.

In the above case, when the page information included in the image data DA1 of the plurality of pages indicates the page of another document, the second page information PA2 is not added, and when the page information included in the image data DA1 of the plurality of pages indicates the page of the image data DA1 of the plurality of pages, the second page information PA2 is added. Therefore, in the above aspect, it is possible to provide a preferable example of obtaining image data in which the difference occurring in the page information is eliminated.

Aspect 9

The output unit 62 may output the image data DA2 of the plurality of pages having the table-of-contents information T1 as a PDF file. In the aspect, it is possible to provide a preferable example of obtaining the image data having a table of contents in which the difference occurring in the page information is eliminated.

Aspect 10

In an information processing program PRO according to an aspect of the present technique, as shown in FIG. 1 and the like, a recognition function FU1 corresponding to the recognition unit (52), a difference elimination function FU2 corresponding to the difference elimination unit 61, and an output function FU3 corresponding to the output unit 62 are implemented in a computer (for example, a copier 1).

According to the above aspect, it is possible to provide an information processing program for acquiring image data of a plurality of pages read from a document and outputting image data having a table of contents in which a difference occurring in the page information regarding the acquired image data is eliminated.

Further, the present technique can be applied to an information processing device included in the above-described scanning system, a complex system including the above-described scanning system, a scanning method, a method for producing scanning data, an information processing method included in the above-described scanning method, a computer-readable medium recording the above-described information processing program, a device for performing information processing, and the like. The above-described information processing device may include a plurality of distributed parts.

2. First Specific Example of Scanning System

FIG. 1 schematically shows a configuration of the scanning system SY1. The scanning system SY1 in the specific example is the single copier 1 (an example of an image forming device), and the scanning system SY1 may be a combination of an image forming device and an external device 100. The copier 1 may include additional elements not shown in FIG. 1. FIG. 2 schematically shows a state in which the table-of-contents information Tl in which the difference in the page information of the bookmark B2*a* is eliminated is added to the image data DA1 of the plurality of pages.

The copier 1 shown in FIG. 1 includes a control unit 10, an operation panel 20, the document reading unit 30, a memory 40, a file output unit 50, and the like.

The control unit 10 includes a CPU 11 as a processor, a ROM 12 as a semiconductor memory, a RAM 13 as a semiconductor memory, a storage unit 14, an I/F 15, and the like, and controls the operation panel 20, the document reading unit 30, the file output unit 50, and the like. Here, the CPU is an abbreviation for central processing unit, the ROM is an abbreviation for read only memory, the RAM is an abbreviation for random access memory, and the I/F is an abbreviation for interface. At least one of the storage unit 14 and the ROM 12 stores the information processing program PRO that causes a computer to function as the copier 1. The CPU 11 executes the information processing program PRO while using the RAM 13 as a work area to perform various kinds of processing such as control processing of the operation panel 20, control processing of the document reading unit 30, and control processing of the file output unit 50. The storage unit 14 may be a semiconductor memory called a flash memory, a magnetic recording medium called a hard disk, or the like. When the external device 100 is coupled, the I/F 15 transmits and receives data to and from the external device 100 according to a predetermined communication protocol. The external device 100 may be a personal computer including a tablet terminal, a mobile phone such as a smartphone, or a storage device such as a memory card.

The processor implementing the control unit 10 is not limited to one CPU, and may be a plurality of CPUs, a hardware circuit such as an ASIC, a combination of the CPU and the hardware circuit, or the like. The ASIC is an abbreviation of application specific integrated circuit.

The operation panel 20 includes a display unit 21 that displays a screen, an input unit 22 that receives an operation on a display screen, and the like. The operation panel 20 may include a dedicated CPU. A display panel such as a liquid crystal panel, or the like can be used as the display unit 21. As the input unit 22, a touch panel attached to a surface of the screen of the display unit 21, a hard key such as a keyboard, a pointing device, or the like can be used.

The document reading unit 30 includes a document conveying unit 31 that conveys the document OR1, a reading unit 32 of the document OR1, an image processing unit 33 that performs set image processing on the image data DA1, and the like. The document reading unit 30 may include a dedicated CPU. The document reading unit 30 reads the document OR1 and generates the image data DA1 of the plurality of pages read from the document OR1. The document conveying unit 31 includes, for example, a feeding tray, a feeding roller pair, a document separating unit, a multi feed detection unit, a conveying roller pair, a discharging roller pair, and a discharging tray. The document conveying unit 31 that continuously feeds a plurality of documents OR1 to the reading unit 32 is called an ADF or an automatic feeding device. Here, the ADF is an abbreviation for auto document feeder. The reading unit 32 sequentially reads a plurality of documents OR1, generates the image data DA1 of the plurality of pages corresponding to the plurality of documents OR1, and stores the image data DA1 in the memory 40. The reading unit 32 may be, for example, an image sensor of a contact image sensor type which is abbreviated as a CIS type or a charge coupled devices type which is abbreviated as a CCD type, a CMOS image sensor, a solid-state image sensor such as a line sensor or an area sensor including a CCD, and a digital camera. Here, the CMOS is an abbreviation for complementary metal-oxide semiconductor. The image processing unit 33 performs image processing of adjusting a color and the like according to an image setting such as a color on the image data DA1 of the plurality of pages stored in the memory 40. As the memory 40, a RAM, a nonvolatile semiconductor memory such as a flash memory, and the like can be used.

The file output unit 50 includes an image loading unit 51, the character recognition unit 52, a file generation unit 53, a print engine 54, and the like. The file output unit 50 may include a dedicated CPU. The image loading unit 51 transfers the image data DA1 from the memory 40 to the character recognition unit 52. The character recognition unit 52 sequentially performs OCR processing on the image data DA1 of the plurality of pages, recognizes characters included in the image data DA1, and generates the recognition result R1. Here, the OCR is an abbreviation for optical character reading. The file generation unit 53 generates, based on the recognition result R1 obtained by the character recognition unit 52, the table-of-contents information T1 (see FIG. 2) in which the difference in the page information is eliminated, and generates a file having the image data DA2 of a plurality of pages having the table-of-contents information T1 (see FIG. 2). The file may be a PDF file, a file in a format such as a bitmap file, or the like. The print engine 54 executes printing on a print medium based on the image data DA1 stored in the memory 40 and a print job received from the external device 100. For example, when the operation panel 20 receives a copy of the document OR1, the document reading unit 30 reads the document OR1 to generate the image data DA1, and the print engine 54 prints a document image on the print medium based on the image data DA1. Accordingly, a copying function is implemented. In addition, when the I/F 15 receives the print job from the external device 100, the control unit 10 generates image data for printing based on the print job and transfers the image data to the print engine 54, and the print engine 54 prints the image on the print medium based on the image data for printing. Accordingly, a printing function is implemented.

The information processing program PRO causes the copier 1 to implement the recognition function FU1, the difference elimination function FU2, the output function FU3, and the like. The recognition function FU1 recognizes the characters included in the image data DA1 of the plurality of pages from the document OR1. A recognition program for causing the copier 1 to implement the recognition function FU1 may be executed by the CPU 11 of the control unit 10, may be executed by the CPU of the file output unit 50, or may be executed by both the CPU 11 of the control unit 10 and the CPU of the file output unit 50. The file output unit 50 that executes the recognition program functions as the character recognition unit 52. The difference elimination function FU2 detects, based on the recognition result R1 obtained by the recognition function FU1, a difference between the first page information PA1 obtained from the recognition result R1 and the second page information PA2 sequentially assigned to the image data DA1. The difference elimination function FU2 generates the table-of-contents information T1 including the page information in which the difference is eliminated. A difference elimination program for causing the copier 1 to implement the difference elimination function FU2 may be executed by the CPU 11 of the control unit 10, may be executed by the CPU of the file output unit 50, or may be executed by both the CPU 11 of the control unit 10 and the CPU of the file output unit 50. The control unit 10 and the file output unit 50 that execute the difference elimination program function as the difference elimination unit 61. The output function FU3 outputs the image data DA2 of the plurality of pages having the table-of-contents information T1. An output program for causing the copier 1 to implement the output function FU3 may be executed by the CPU 11 of the control unit 10, may be executed by the CPU of the file output unit 50, or may be executed by both the CPU 11 of the control unit 10 and the CPU of the file output unit 50. The control unit 10 and the file output unit 50 that execute the output program function as the output unit 62.

The storage unit 14 storing the information processing program PRO can be said to be a computer-readable medium recording the information processing program PRO. When the information processing program PRO is recorded in an external recording medium, the recording medium can be said to be a computer-readable medium recording the information processing program PRO.

As shown in FIG. 2, the document OR1 having a plurality of pages, such as a book, has a document in which a page of a main text starts in the middle. This is because the document OR1 having the plurality of pages includes parts such as a cover and a preface that are not subject to page number assignment of the main text. However, the document reading unit 30 grasps the pages of the document OR1 in order from the beginning. Therefore, a difference may occur between the first page information PA1 recognized from the document OR1 and the second page information PA2 sequentially assigned to the image data DA1 of the plurality of pages. A user looking for a desired location in the main text by viewing the image data DA1 of the plurality of pages read from the document OR1 may take time to reach the desired location in the main text due to the difference in the page information.

In the specific example, in order to cope with the above-described inconvenience, the image data DA2 of the plurality of pages having the table-of-contents information T1 including the page information in which the difference is eliminated is generated based on recognition result R1.

In the document OR1 shown in FIG. 2, a first page has a cover, a second page has a preface, third to eighth pages have the main text with the first page information PA1 attached, and the third, fourth, and seventh pages have a heading C0. The heading C0 in the specific example is a conspicuous part in the main text, such as a large font, and is a combination of numbers and other characters. Therefore, the "preface" is not the heading C0, but the heading C1 in which "1. AAA" appears first in a reading order. When the document reading unit 30 reads the document OR1, the second page information PA2 sequentially assigned to the image data DA1 is different from the first page information PA1 recognized in accordance with the document OR1 because the cover is on a first page and a first page of the main text including the first heading C1 is on a third page.

The difference elimination unit 61 first generates bookmark information B1 by associating each heading C0 with the second page information PA2 starting from the first page. The bookmark information B1 includes the second page information PA2 starting from a first page in a part to be the bookmark B2*a* and in the link L1. Since the second page information PA2 that is different from the first page information PA1 included in the displayed image data DA2 is a part to be the bookmark B2*a*, the user may search for a desired location of the image data DA2 according to the first page information PA1 in accordance with the document OR1. For example, when the user searches for a main text starting from the heading "AAA" from the image data DA2 of the plurality of pages, when the user mistakenly searches for the page information in accordance with the document OR1 from the image data DA2, the user finds a fifth page, which is different from the third page that is supposed to be originally searched.

Then, the difference elimination unit 61 replaces the second page information PA2 of the part to be the bookmark B2*a* in the bookmark information B1 with the first page information PA1. The obtained bookmark information B2 is the table-of-contents information T1 in which the first page information PA1 in accordance with the document OR1 is displayed on the bookmark B2*a*, and is the table-of-contents information Tl including the link L1 on which the image data DA2 corresponding to the second page information PA2 starting from the first page is displayed. The bookmark information B2 can also be referred to as a linked table of contents.

The output unit 62 uses the image data DA1 of the plurality of pages read from the document OR1 as a main body DA2*a*, adds the bookmark information B2 to the main body DA2*a*, and generates a file (the image data DA2 of the plurality of pages). For example, when the user searches for a main text starting from the heading "AAA" from the image data DA2 of the plurality of pages, when the user searches for the first page shown in the bookmark B2*a* from the image data DA2, the user can find the correct third page starting from the first page.

As shown in FIG. 3, when the document OR1 includes the table of contents T2, the bookmark information B2 may be generated based on a recognition result of the table of contents T2. FIG. 3 schematically shows a state in which the table-of-contents information Tl in which the difference in the page information of the link L1 is eliminated is added to the image data DAL of the plurality of pages.

In the document OR1 shown in FIG. 3, first, third to eighth pages are the same as the first, third to eighth pages in FIG. 2, and a second page has a table of contents.

The difference elimination unit 61 generates the bookmark information B1 based on the recognized table of contents T2. The bookmark information B1 includes the first page information PA1 in accordance with the document OR1 in a part to be the bookmark B2*a* and in the link L1. Since the first page information PA1, which is different from the second page information PA2 starting from the first page, is in the link L1, the user may search for a desired location according to the link L1 from the image data DA2 of the plurality of pages by an operation of the displayed bookmark B2*a*. For example, when the user searches for a main text starting from the heading "AAA" from the image data DA2 of the plurality of pages, the user finds a first page that is different from the third page, which is supposed to be originally searched, by the operation of the heading "AAA" included in the bookmark B2*a*.

Then, the difference elimination unit 61 replaces the first page information PA1 of the link L1 with the second page information PA2. The obtained bookmark information B2 is the table-of-contents information Tl in which the first page information PA1 in accordance with the document OR1 is displayed on the bookmark B2*a*, and is the table-of-contents information Tl including the link L1 on which the image data DA2 corresponding to the second page information PA2 starting from the first page is displayed.

The output unit 62 uses the image data DA1 of the plurality of pages read from the document OR as a main body DA2*a*, adds the bookmark information B2 to the main body DA2*a*, and generates a file (the image data DA2 of the plurality of pages). For example, when the user searches for a main text starting from the heading "AAA" from the image data DA2 of the plurality of pages, the user can find the correct third page starting from the first page by the operation of the heading "AAA" included in the bookmark B2*a*.

Hereinafter, with reference to FIGS. 4 and 5, an example of the file generation processing of outputting, as a file, the image data DA2 of the plurality of pages having the table-of-contents information Tl including the page information in which the difference is eliminated will be described. The file generation processing is mainly performed by the control unit 10. Upon receiving an instruction to generate a file in the operation panel 20 or the external device 100, the control unit 10 starts the file generation processing. Here, the control unit 10 performs processing of steps S102 to S104 in cooperation with the document reading unit 30. Hereinafter, a description of "step" will be omitted. The control unit 10 performs processing of S106 in cooperation with the character recognition unit 52. Therefore, S106 corresponds to the recognition function FU1. The control unit 10 performs processing of S108 to S116 and S152 to S154 in cooperation with the file generation unit 53. Therefore, S108 to S116 and S152 to S154 correspond to the difference elimination unit 61 and the difference elimination function FU2. The control unit 10 performs processing of S118 to S120 and S156 to S158 in cooperation with the file generation unit 53. Therefore, S118 to S120 and S156 to S158 correspond to the output unit 62 and the output function FU3.

It is assumed that the user sets a plurality of documents OR1 on the document conveying unit 31 serving as an ADF before instructing file generation.

When the file generation processing is started, the document reading unit 30 reads the document OR1 to generate the image data DA1 of a plurality of pages (S102). The document reading unit 30 stores the image data DA1 of the plurality of pages read from the document OR1 in the memory 40 (S104).

Next, the image loading unit 51 transfers the image data DA1 from the memory 40 to the character recognition unit 52, and the character recognition unit 52 performs OCR processing on the image data DA1 of the plurality of pages in a reading order and performs character recognition processing to recognize characters included in the image data DA1 (S106).

Next, the file generation unit 53 searches for the heading C0 of each chapter from the recognition result R1, and acquires a page number NP2 of the image data DA1 in which each heading C0 is present (S108). The page number NP2 is a numerical value indicating the second page information PA2 starting from a first page. The file generation unit 53 can acquire the page number NP2 of the image data DA1 in which each heading C0 is present, by searching from the recognition result R1 for a conspicuous part such as a large font in the main text, and a combination of numbers and other characters. In the example shown in FIGS. 2 and 3, a combination of a heading "1. AAA" and NP2=3, a combination of a heading "2. BBB" and NP2=4,and a combination of a heading "3. CCC" and NP2=7 are acquired. Among the one or more headings CO, the first searched heading, for example, "1. AAA" is the heading C1 that is the start of the first page information PA in accordance with the document OR1. Therefore, the file generation unit 53 searches from the recognition result R1 for the heading C1 that is the start of the first page information PA1.

Next, the file generation unit 53 calculates the skip page number Ns by subtracting 1 from the page number NP2 where the first heading Cl is present (S110). In the example shown in FIGS. 2 and 3, 2 obtained by subtracting 1 from the page number NP2=3 where the first heading "1. AAA" is present is the skip page number Ns.

Next, the file generation unit 53 branches the processing according to whether the table of contents T2 including the page number NP1 in accordance with the document OR1 is included in the recognition result R1 (S112). When there is a page in which the "table of contents" is included in the recognition result R1 and the "table of contents" is a conspicuous part in which a font thereof is larger than that of other parts, the file generation unit 53 can determine that the table of contents T2 is included in the recognition result R1 in a page including the "table of contents". When the table of contents T2 is included in the recognition result R1 as shown in FIG. 3, the file generation unit 53 advances the processing to S152 (see FIG. 5), and the processing proceeds to S114 as shown in FIG. 2.

When the table of contents T2 is not included in the recognition result R1, the file generation unit 53 generates the bookmark information B1 (see FIG. 2) by associating the heading C0 with the page number NP2 starting from the first page for each heading C0 (S114). A part of the generated bookmark information B1 to be the bookmark B2*a* includes the page number NP2 (the second page information PA2) that is different from the page number NP1 (the first page information PA1) included in the displayed image data DA2. Then, the file generation unit 53 corrects each page number NP2 included in the part to be the bookmark B2*a* to the page number NP1 that is obtained by reducing the skip page number Ns (S116). Accordingly, the bookmark information B2 is generated in which the page number NP1 (the first page information PA1) associated with each heading is displayed as the bookmark B2*a*. The bookmark information B2 is the table-of-contents information T1 in which the first page information PA1 in accordance with the document OR1 is displayed on the bookmark B2*a*, and is the table-of-contents information Tl including the link L1 on which the image data DA2 corresponding to the second page information PA2 starting from the first page of image data DA2 of the plurality of pages is displayed.

As described above, the difference elimination unit 61 detects a difference between the first page information PA1 and the second page information PA2 as the skip page number Ns, and generates the table-of-contents information T1 including the page information in which the difference is eliminated. Addition of the first page information PA1 to the bookmark information is not limited to correcting the second page information PA2 to the first page information PA1, and the first page information PA1 may be written together with the second page information PA2. For example, when the page number NP2=3 corresponds to the page number NP1=1, the difference elimination unit 61 may replace a display location "3" in the second page information PA2 with "3(1)", "1(3)", or the like.

Next, the file generation unit 53 generates an electronic file by using the image data DA1 of the plurality of pages read from the document OR1 as the main body DA2*a*and adding the bookmark information B2 to the main body DA2*a*(S118). The obtained file is the image data DA2 of the plurality of pages having the bookmark information B2 as the table-of-contents information T1. The file generation unit 53 can generate, for example, a PDF file including the main body DA2*a* and the bookmark information B2. Thereafter, the control unit 10 outputs the file according to a setting (S120), and ends file generation processing. An output destination of the file may be the external device 100, an e-mail destination, the storage unit 14 included in the copier 1, the print engine 54 for printing on the main body DA2*a*, the display unit 21 for display, or the like. For example, when the file is displayed on the external device 100 or the display unit 21, the user can find a correct page by searching for the page of the first page information PA1 indicated by the bookmark B2*a* from the image data DA2.

As shown in FIG. 3, when the table of contents T2 is included in the recognition result R1, the file generation unit 53 generates the bookmark information B1 based on the table-of-contents T2 included in the recognition result R1 in the page including the "table of contents" (S152 of FIG. 5). The bookmark information B1 includes the page number NP1 (the first page information PA1) in accordance with the document OR1 in a part to be the bookmark B2*a* and in the link L1. Therefore, when the link L1 is operated, the image data DA2 of the plurality of pages is not the page number NP2 (the second page information PA2) starting from the first page to be originally jumped, but is jumped to the page number NP1 in accordance with the document OR1. Accordingly, the image data DA2 of a wrong page is displayed. Then, the file generation unit 53 corrects the page number NP1 included in the link L1 to the page number NP2 that is obtained by increasing the skip page number Ns (S154). Accordingly, the bookmark information B2 including the link L1 on which the image data DA2 corresponding to the page number NP2 starting from the first page among the image data DA2 of the plurality of pages is displayed is generated. The bookmark information B2 is the table-of-contents information T1 in which the first page information PAL in accordance with the document OR1 displayed on the bookmark B2*a*, and is the table-of-contents information T1 including the link L1 on which the image data DA2 corresponding to the second page information PA2 starting from the first page of image data DA2 of the plurality of pages is displayed.

As described above, the difference elimination unit 61 detects a difference between the first page information PA1 and the second page information PA2 as the skip page number Ns, and generates the table-of-contents information T1 including the page information in which the difference is eliminated.

Next, as in S118, the file generation unit 53 generates an electronic file, for example, a PDF file, by using the image data DA1 of the plurality of pages read from the document OR1 as the main body DA2*a* and adding the bookmark information B2 to the main body DA2*a* (S156). The obtained file is the image data DA2 of the plurality of pages having the bookmark information B2 as the table-of-contents information T1. Thereafter, as in S120, the control unit 10 outputs the file according to a setting (S158), and ends file generation processing. For example, when the file is displayed on the external device 100 or the display unit 21, the user can find a correct page starting from the first page according to the link L1 by the operation of the heading included in the bookmark B2*a*.

As described above, the table-of-contents information T1 included in the image data DA2 of the plurality of pages to be output includes page information in which the difference between the first page information PA1 and the second page information PA2 is eliminated. Therefore, the present scanning system SY1 can output image data having a table of contents in which a difference occurring in page information is eliminated from the image data DA1 of the plurality of pages read from the document OR1.

Even when the table of contents T2 is included in the image data DA1 of the plurality of pages as shown in FIG. 3, the scanning system SY1 may generate the image data DA2 of the plurality of pages as shown in FIG. 2 by generating the bookmark information B1 shown in FIG. 2 independently of the table of contents T2 and correcting the page information of the part to be the bookmark B2*a*. In this case, the scanning system SY1 may perform steps S102 to S110 and $114 to S120 without performing steps S112 and S152 to S158 in the file generation processing shown in FIGS. 4 and 5.

3. Second Specific Example of Scanning System

FIG. 6 schematically shows a state in which the difference in the page information included in the image data DA1 of a plurality of pages is eliminated in the second specific example. A configuration of the scanning system SY1 in the second specific example is the same as the configuration shown in FIG. 1, and detailed description thereof is omitted.

In the document OR1 shown in FIG. 6, there is a cover on a first page, a back cover on a tenth page, blank pages on a second and a ninth page, a preface with an "i" attached as the first page information PAL on a third page, the table of contents T2 with a first page number "1" attached as the first page information PA1 on a fourth page, main texts with page numbers "2" to "5" attached as the first page information PA1 on fifth to eighth pages, and the headings C0 on the fifth and eighth pages. When the document reading unit 30 reads the document OR1, the second page information PA2 sequentially assigned to the image data DA1 is different from the first page information PA1 recognized in accordance with the document OR1 because the cover is on the first page and the first page number "1" is on the fourth page.

Since the first page information PA1 indicated by the table of contents T2 included in the image data DA1 of the plurality of pages is different from the second page information PA2 starting from the first page, the user may search for a desired location in the image data DA2 according to the first page information PA1 in accordance with the document OR1. For example, when the user searches for a main text starting from the heading "AAA" included in the table of contents T2 from the image data DA2 of the plurality of pages, when the user mistakenly searches for the page information in accordance with the document OR1 from the image data DA2, the user finds the second page, which is different from the fifth page that is supposed to be originally searched.

In addition to the table of contents T2, since the first page information PA1 included in the image data DA1 of the plurality of pages is different from the second page information PA2 starting from the first page, the user may search for a desired location in the image data DA2 according to the first page information PA1 in accordance with the document OR1.

Then, the difference elimination unit 61 identifies, based on the recognition result R1, a position of the first page information PA1 included in the image data DA1 of the plurality of pages, and adds the second page information PA2 to the image data DA1 of the plurality of pages at the position of the first page information PA1. In other words, the difference elimination unit 61 rewrites a description of a page number in an image included in the image data DA1 of the plurality of pages to an actual page number of the image data DA1. A value obtained by subtracting the page number corresponding to the first page information PA1 from the page number corresponding to the second page information PA2 corresponds to the skip page number Ns in the first specific example. The table-of-contents information T1 obtained based on the table of contents T2 is information in which the second page information PA2 starting from the first page is displayed. The output unit 62 generates a file including the image data DA2 of the plurality of pages in which the page information is replaced. For example, when the user searches for a main text starting from the heading "AAA" included in the table-of-contents information T1 from the image data DA2 of the plurality of pages, when the user searches for the fifth page shown in the table-of-contents information Tl from the image data DA2, the user can find the correct fifth page starting from the first page.

Hereinafter, with reference to FIGS. 7 and 8, in the second specific example, an example of the file generation processing of outputting, as a file, the image data DA2 of the plurality of pages having the table-of-contents information T1 including the page information in which the difference is eliminated will be described. FIG. 7 is a flowchart schematically showing the above-described file generation processing. FIG. 8 schematically shows a state in which the page information attached to the main text TXT is corrected without correcting the page information of the main text TXT.

An upper part of FIG. 8 shows an eighth page starting from the first page in the image data DAL of the plurality of pages shown in FIG. 6. The image data DA1 of the eighth page includes the main text TXT including page information PA12 and PA13 and page information PA11 attached to the main text TXT. The page information PA11 attached to the main text TXT is located at a position indicating the page of the main text TXT, and thus is the first page information PA1 in accordance with the document OR1. However, the page information included in the main text TXT includes the page information PA12 indicating a page of the main text TXT itself, and the page information PA13 indicating a page of a document other than the document OR1. Of course, the difference elimination unit 61 may correct the page information included in the main text TXT, whether it is the page information PA12 or the page information PA13, to the second page information PA2 starting from the first page. However, in consideration of the fact that the page information PA13 indicating the page of another document is included in the main text TXT, the difference elimination unit 61 in the second specific example does not add the second page information PA2 starting from the first page to the position of the main text TXT. Further, the difference elimination unit 61 in the second specific example adds the second page information PA2 to the image data DAL of the plurality of pages at the position of the first page information PA1. Accordingly, as shown in a lower part of FIG. 8, the page information PA12 and PA13 are not replaced with the second page information PA2, and the image data DA2 in which the page information PA11 is replaced with the second page information PA2 is obtained.

The file generation processing shown in FIG. 7 is mainly performed by the control unit 10. Upon receiving an instruction to generate a file in the operation panel 20 or the external device 100, the control unit 10 starts the file generation processing. Here, the control unit 10 performs processing of steps S202 to S204 in cooperation with the document reading unit 30. The control unit 10 performs processing of S206 in cooperation with the character recognition unit 52. Therefore, $206 corresponds to the recognition function FU1. The control unit 10 performs processing of S208 to S214 in cooperation with the file generation unit 53. Therefore, steps S208 to S214 correspond to the difference elimination unit 61 and the difference elimination function FU2. The control unit 10 performs processing of S216 to S218 in cooperation with the file generation unit 53. Therefore, S216 to S218 correspond to the output unit 62 and the output function FU3.

When the file generation processing is started, as in S102 shown in FIG. 4, the document reading unit 30 reads the document OR1 to generate the image data DA1 of the plurality of pages (S202). As in S104 shown in FIG. 4, the document reading unit 30 stores the image data DA1 of the plurality of pages read from the document OR1 in the memory 40 (S204).

Next, as in S106 shown in FIG. 4, the image loading unit 51 transfers the image data DA1 from the memory 40 to the character recognition unit 52, and the character recognition unit 52 performs OCR processing on the image data DA1 of the plurality of pages in a reading order and performs character recognition processing to recognize characters included in the image data DA1 (S206).

Next, the file generation unit 53 identifies, based on the recognition result R1, the page of the table of contents T2 in the image data DAL of the plurality of pages, and identifies all positions of the first page information PA1 presenting in the page of the table of contents T2 (S208). When there is a page in which the "table of contents" is included in the recognition result R1 and the "table of contents" is a conspicuous part in which a font thereof is larger than that of other parts, the file generation unit 53 can determine that the table of contents T2 is included in the recognition result R1 in a page including the "table of contents". For example, in the example shown in FIG. 6, it is identified that the page of the table of contents T2 is the fourth page, and all the positions of the first page information PA1 presenting in the fourth page are identified.

Next, the file generation unit 53 identifies, based on the recognition result R1, the position of the main text TXT and the position of the first page information PA1 attached to the main text TXT in a page after the page of the table of contents T2 among the image data DAL of the plurality of pages (S210). The file generation unit 53 may determine, for example, information at a position assumed to be the page information, such as a lower center position or an upper right position in the image data DA1, as the first page information PA, and may store the position of the first page information PA1. In addition, for example, the file generation unit 53 can determine that information at a position not assumed to be the page information in the image data DA1 is the main text TXT, and may store the position of the main text TXT.

Next, the file generation unit 53 adds the second page information PA2 starting from the first page to the position of the first page information PA1 in accordance with the document OR1 on the page of the table of contents T2 (S212). Accordingly, as shown in FIG. 6, the second page information PA2 is added to each position of the first page information PA1 in the page of the table of contents T2.

As described above, the difference elimination unit 61 generates the table-of-contents information T1 in which the second page information PA2 is displayed as the page information in which the difference is eliminated. Addition of the second page information PA2 to the page of the table of contents T2 is not limited to correcting the first page information PA1 to the second page information PA2, and the second page information PA2 may be written together with the first page information PA1. For example, when the page number "2" as the second page information PA2 corresponds to the page number "5" as the first page information PA1, the difference elimination unit 61 may replace a display location "2" of the first page information PA1 with "2(5)", "5(2)", or the like.

Next, the file generation unit 53 adds the second page information PA2 to the image data DA1 of the plurality of pages at the position of the first page information PA1 attached to the main text TXT without adding the second page information PA2 to the position of the main text TXT (S214). Accordingly, as shown in FIG. 8, the second page information PA2 is not added to the position of the main text TXT, and the second page information PA2 is added to the image data DA1 of the plurality of pages at the position of the first page information PA1 attached to the main text TXT.

Of course, addition of the second page information PA2 to the position of the first page information PA1 is not limited to correcting the first page information PA1 to the second page information PA2, and the second page information PA2 may be written together with the first page information PA1. For example, when the page number "2" as the second page information PA2 corresponds to the page number "5" as the first page information PA1, the difference elimination unit 61 may replace a display location "2" of the first page information PA1 with "2(5)", "5(2)", or the like.

Next, the file generation unit 53 generates an electronic file including the image data DA2 of the plurality of pages having the obtained table-of-contents information T1 (S216). Thereafter, the control unit 10 outputs the file according to a setting (S218), and ends file generation processing. For example, when the file is displayed on the external device 100 or the display unit 21, the user can find a correct page when the user searches for the page of the second page information PA2 indicated by the page of the table of contents T2 from the image data DA2.

As described above, the table-of-contents information T1 included in the image data DA2 of the plurality of pages to be output includes page information in which the difference between the first page information PA1 and the second page information PA2 is eliminated. Therefore, the scanning system SY1 in the second specific example can also output image data having a table of contents in which a difference occurring in page information is eliminated from the image data DAL of the plurality of pages read from the document OR1.

4. Third Specific Example of Scanning System

In the example shown in FIGS. 7 and 8, although the page information included in the main text TXT is not corrected, it is preferable that the second page information PA2 starting from the first page be added to the position of the page information PA12 indicating the page of the main text TXT itself. Then, with reference to FIGS. 9 and 10, in the third specific example, an example of file generation processing of outputting, as a file, the image data DA2 of the plurality of pages having the page information in which the difference is eliminated will be described. A configuration of the scanning system SY1 in the third specific example is the same as the configuration shown in FIG. 1, and a detailed description thereof is omitted.

The file generation unit 53 in the third specific example includes a page information determination unit that determines whether the page information included in the main text TXT indicates a page of the main text TXT itself or a page of a document other than the document OR1. The page information determination unit can use, for example, a page information determination model generated by machine learning for determining whether the page information included in the main text TXT indicates the page of the main text TXT itself or the page of the document other than the document OR1.

FIG. 9 is a flowchart schematically showing the above-described file generation processing. In the file generation processing shown in FIG. 9, processing of S252 to S256 are added to the file generation processing shown in FIG. 7. The control unit 10 performs processing of S252 to S256 in cooperation with the file generation unit 53. Therefore, S252 to S256 correspond to the difference elimination unit 61 and the difference elimination function FU2. FIG. 10 schematically shows a state in which the page information PA11 and PA12 of the image data DA1 are corrected without correcting the page information PA13 of another document.

An upper part of FIG. 10 shows an eighth page starting from the first page in the image data DAL of the plurality of pages shown in FIG. 6. The main text TXT on the eighth page includes the page information PA12 indicating the page of the main text TXT itself and the page information PA13 indicating the page of a document other than the document OR1. The difference elimination unit 61 does not correct the page information PA13 indicating the page of another document, and adds the second page information PA2 to the position of the page information PA12 indicating the page of the main text TXT itself. Accordingly, as shown in a lower part of FIG. 10, the page information PA13 indicating the page of another document is not replaced with the second page information PA2, and the image data DA2 in which the page information PA11 and PA12 indicating the page of the main text TXT itself are replaced with the second page information PA2 is obtained.

When the file generation processing is started, the processings of S202 to S214 shown in FIG. 7 are performed. Thereafter, the file generation unit 53 identifies, based on the recognition result R1, the positions of the page information PA12 and PA13 included in the main text TXT (S252). Therefore, the difference elimination unit 61 identifies, based on the recognition result R1, the position of the page information included in the image data DAL of the plurality of pages in S210 shown in FIGS. 7 and S252 shown in FIG. 9.

Next, the file generation unit 53 determines, based on the recognition result R1, whether each piece of page information included in the main text TXT indicates a page of the main text TXT or a page of another document (S254). Therefore, in S208 to S210 shown in FIGS. 7 and S254 shown in FIG. 9, the difference elimination unit 61 determines, based on the recognition result R1, whether the page information included in the image data DA of the plurality of pages indicates the page of the image data DA1 of the plurality of pages or indicates the page of another document.

Next, the file generation unit 53 adds the second page information PA2 starting from the first page to the image data DA1 at the position of the page information PA12 indicating the page of the main text TXT (S256). Therefore, in S212 to S214 shown in FIGS. 7 and S256 shown in FIG. 9, the difference elimination unit 61 does not add the second page information PA2 to the position where the page information included in the image data DA1 of the plurality of pages indicates the page of another document. Further, the difference elimination unit 61 adds the second page information PA2 to the image data DA1 of the plurality of pages at the position where the page information included in the image data DA1 of the plurality of pages indicates the page of the image data DA1 of the plurality of pages.

Of course, addition of the second page information PA2 to the position of the first page information PA1 is not limited to correcting the first page information PA1 to the second page information PA2, and the second page information PA2 may be written together with the first page information PA1. For example, when the page number "2" as the second page information PA2 corresponds to the page number "5" as the first page information PA1, the difference elimination unit 61 may replace a display location "2" of the first page information PA1 with "2(5)", "5(2)", or the like.

Next, the file generation unit 53 generates an electronic file including the image data DA2 of the plurality of pages with the second page information PA2 added to a position indicating the page of the image data DA1 (S216). Thereafter, the control unit 10 outputs the file according to a setting (S218), and ends file generation processing. For example, when the file is displayed on the external device 100 or the display unit 21, the user can find a correct page when the user searches for the page of the page information PA12 indicating the page of the main text TXT from the main text TXT.

As described above, when the page information included in the image data DA1 indicates the page of another document, the second page information PA2 is not added, and when the page information included in the image data DA1 indicates the page of the image data DA1, the second page information PA2 is added. Therefore, the scanning system SY1 in the third specific example can output image data in which a difference occurring in page information is more appropriately eliminated from the image data DA1 of the plurality of pages read from the document OR1.

5. Modifications

Various modifications of the present disclosure are considered.

For example, the copier 1 may be a multifunction peripheral having a facsimile communication function or the like. In the scanning system SY1, a scanner dedicated device, a digital camera, a smartphone, a personal computer, or the like may be used instead of the document reading unit in the copier 1. Alternatively, a scanner dedicated device, a digital camera, a smartphone, a personal computer, or the like may include all of the document reading unit, the recognition unit, the difference elimination unit, and the output unit and may be replaced with the copier 1 itself.

A part of the above-described processing may be performed by the external device 100. In this case, a combination of the copier 1 and the external device 100 is an example of the scanning system SY1.

The above-described processing can be appropriately changed, such as changing the order. For example, in the file generation processing shown in FIG. 9, the processing of S252 can be performed before the processing of S212 or S214 shown in FIG. 7.

6. Conclusion

As described above, according to the present disclosure, it is possible to provide a technique capable of outputting image data having a table of contents in which a difference occurring in page information is eliminated from image data of a plurality of pages read from a document. Of course, basic operations and effects described above can also be obtained by the technique including only constituent features according to the independent claims.

In addition, a configuration in which the configurations disclosed in the above-described examples are mutually replaced or a combination thereof is changed, a configuration in which the configurations disclosed in the known technique and the above-described examples are mutually replaced or a combination thereof is changed, and the like may be implemented. Further, the user may select which aspect of the various aspects described above is used to eliminate a difference occurring in page information, and the selected aspect may be used to eliminate the difference occurring in the page information. In addition, depending on the document, it may be determined that there is no difference from the beginning as a result of recognizing first page information. In such a case, second image data may be generated and output as it is. The present disclosure also includes such configurations.

What is claimed is:

1. A scanning system comprising:

an image sensor configured to read a document to generate first digital image data of a plurality of pages read from the document; and a processor configured to perform character recognition processing on the first digital image data to generate first page information including page numbers of respective pages obtained from recognition result of the character recognition processing, configured to sequentially assign page numbers to the pages of the first digital image data to generate second page information including the sequentially assigned page numbers, configured to detect a difference between the page numbers included in the first page information and the sequentially assigned page numbers included in the second page information to generate table-of-contents information including page information in which the difference is eliminated, and configured to output second digital image data including the table-of-contents information to an external device.

2. The scanning system according to claim 1, wherein the processor generates the table-of-contents information, which is table-of-contents information in which the first page information is displayed, including a link on which digital image data of a page corresponding to the second page information among the digital image data of the plurality of pages is displayed.

3. The scanning system according to claim 2, wherein the processor searches for a heading, which is a start of the first page information, from the recognition result, and generates the table-of-contents information in which the first page information starting from a page in which the heading is present is displayed as a bookmark.

4. The scanning system according to claim 2, wherein when a table of contents including the first page information is included in the recognition result, the processor generates, from the table of contents, the table-of-contents information, which is the table-of-contents information in which the first page information is displayed as a bookmark, including a link on which digital image data corresponding to the second page information among the digital image data of the plurality of pages is displayed.

5. The scanning system according to claim 1, wherein the processor generates the table-of-contents information in which the second page information is displayed.

6. The scanning system according to claim 5, wherein the processor identifies, based on the recognition result, a position of the first page information included in the digital image data of the plurality of pages, and adds the second page information to the digital image data of the plurality of pages at the position of the first page information.

7. The scanning system according to claim 5, wherein the processor identifies, based on the recognition result, a position of a main text and a position of the first page information attached to the main text in digital image data of the plurality of pages, does not add the second page information to the position of the main text, but adds the second page information to the digital image data of the plurality of pages at the position of the first page information.

8. The scanning system according to claim 5, wherein the processor identifies, based on the recognition result, a position of the page information included in digital image data of the plurality of pages, determines, based on the recognition result, whether the page information included in the digital image data of the plurality of pages indicates a page of the digital image data of the plurality of pages or indicates a page of another document, does not add the second page information to a position where the page information included in the digital image data of the plurality of pages indicates the page of another document, but adds the second page information to the digital image data of the plurality of pages at a position where the page information included in the digital image data of the plurality of pages indicates the page of the image digital data of the plurality of pages.

9. The scanning system according to claim 1, wherein
the output unit processor outputs the second digital image data as a PDF file.

10. A non-transitory computer-readable storage medium storing an information processing program, the program causing a computer to execute:

generating first digital image data of a plurality of pages read from a document:

performing a character recognition processing on the first digital image data to generate first page information including page numbers of respective pages obtained from recognition result of the character recognition processing;

sequentially assigning page numbers to the pages of the first digital image data to generate second page information including the sequentially assigned page numbers;

detecting a difference between the page numbers included in the first page information and the sequentially assigned page numbers included in the second page information to generate table-of-contents information including page information in which the difference is eliminated; and outputting second image data including the table-of-contents information to an external device.

11. A method for generating second image data, the method comprising:

generating first digital image data of a plurality of pages read from a document;

performing a character recognition processing on the first digital image data to generate first page information including page numbers of respective pages obtained from recognition result of the character recognition processing;

sequentially assigning page numbers to the pages of the first digital image data to generate second page information including the sequentially assigned page numbers;

detecting a difference between the page numbers included in the first page information and the sequentially assigned page numbers included in the second page information; and generating second image data in which the detected difference is eliminated.

* * * * *